United States Patent

Kong

[11] Patent Number: 5,878,210
[45] Date of Patent: *Mar. 2, 1999

[54] PERSONAL COMPUTER HAVING A SECURITY FUNCTION, A METHOD OF IMPLEMENTING THE SECURITY FUNCTION, AND METHODS OF INSTALLING AND DETACHING A SECURITY DEVICE TO/FROM A COMPUTER

[75] Inventor: Won-keun Kong, Suwon, Rep. of Korea

[73] Assignee: Samsung Electronics Co., Ltd., Kyungki-do, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 684,226

[22] Filed: Jul. 19, 1996

[30] Foreign Application Priority Data

Aug. 10, 1995 [KR] Rep. of Korea .................... 95-24697

[51] Int. Cl.[6] .................................................. G06F 13/00
[52] U.S. Cl. .............................................. 395/186; 380/25
[58] Field of Search .......................... 395/186, 187.01, 395/188.01, 733, 700, 726, 479, 490, 491, 494, 600, 739, 185.09; 380/4, 3, 23, 49, 25; 340/825.31

[56] References Cited

U.S. PATENT DOCUMENTS

| | | | |
|---|---|---|---|
| 5,377,269 | 12/1994 | Heptig et al. ............................ | 380/25 |
| 5,421,006 | 5/1995 | Jablon et al. ........................... | 395/575 |
| 5,448,045 | 9/1995 | Clark ...................................... | 235/382 |
| 5,483,649 | 1/1996 | Kuznetsov et al. .................... | 395/186 |
| 5,542,044 | 7/1996 | Pope ...................................... | 395/186 |
| 5,581,763 | 12/1996 | Hait ....................................... | 395/186 |
| 5,586,301 | 12/1996 | Fisherman et al. ..................... | 395/479 |
| 5,603,002 | 2/1997 | Hashimoto ............................. | 395/440 |
| 5,623,637 | 4/1997 | Jones et al. ............................ | 395/491 |
| 5,628,015 | 5/1997 | Singh ..................................... | 395/186 |

Primary Examiner—Robert W. Beausoliel, Jr.
Assistant Examiner—Nadeem Iqbal
Attorney, Agent, or Firm—Sughrue, Mion, Zinn, Macpeak & Seas, PLLC

[57] ABSTRACT

A personal computer having a security function, a security method therefor, and methods of installing and detaching a security device are provided. The personal computer includes: an input portion for inputting a password and a user's command to the personal computer; a hard disk having a boot sector without partition, which is booted in response to a booting permission signal; an output and memory portion for outputting data and storing the password; an input portion controller for controlling the input portion using a terminate-and-stay-resident (TSR) executive control program according to the requirement of the user after the hard disk is booted; a security program storing portion for storing a booting control program for generating the booting permission signal in response to an initializing signal, according to whether the password input by the user is valid and whether the hard disk is the same as that initially installed, a TSR executive control program for controlling the input portion, a history function program for storing the history of work executed by the user, and partition information of the hard disk; a security portion including a security program storing unit; and a controller for controlling the input portion, the hard disk, the output and memory portion, and the security portion, wherein the hard disk is booted in response to whether the security portion is the initially installed security portion.

24 Claims, 7 Drawing Sheets

PERSONAL COMPUTER HAVING A SECURITY FUNCTION, A METHOD OF IMPLEMENTING THE SECURITY FUNCTION, AND METHODS OF INSTALLING AND DETACHING A SECURITY DEVICE TO/FROM A COMPUTER

BACKGROUND OF THE INVENTION

The present invention relates to a personal computer (PC), and more particularly, to a PC having a security function, a security method therefor, and methods of installing and detaching a security device in and from the PC.

Currently, PC's are being used by many different kinds of people for various applications, some of which involve highly sensitive information. Thus, PC's have provided users with various measures for security of such information.

A PC security method has three aspects: a first aspect of preventing an unauthorized user from booting the PC; a second aspect of preventing the usage of input devices such as a keyboard or mouse; and a third aspect of preventing valuable information from being read and copied.

The above security method generally requires a user to input a password for permitting the use of the PC. However, if the password is revealed, the conventional PC protection function is useless.

Furthermore, it is not difficult for an unauthorized user who doesn't know the password to find it on a hard disk. Thus, an unauthorized user can copy valuable information from the booted PC without permission, thereby exposing information. Also, even if the PC includes the security device, it may be detached from the PC by an unauthorized user and the hard disk thereof may be accessed to expose information.

SUMMARY OF THE INVENTION

To solve the above problems, it is an object of the present invention to provide a PC for storing information input and preventing the stored information from being processed by an authorized user and preventing an input device of the PC from being used by an unauthorized user.

It is another object of the present invention to provide a method for securing the PC by preventing an input device of the PC from being used by an unauthorized user, by using a program stored in an EEPROM adopted as a security device after the boot of the PC.

It is still another object of the present invention to provide a method of installing the security device in the PC.

It is still yet another object of the present invention to provide a method for detaching the security device from the PC.

According to an aspect of the present invention, there is provided a personal computer having a security function comprising: an input portion for inputting a password and a user's command to the personal computer; a hard disk having a boot sector without partition, which is booted in response to a booting permission signal; an output and memory portion for outputting data and storing the password; an input portion controller for controlling the input portion using a terminate-and-stay-resident (TSR) executive control program according to the requirement of the user after the hard disk is booted; a security program storing portion for storing a booting control program for generating the booting permission signal in response to an initializing signal, according to whether the password input by the user is valid and whether the hard disk is the same as that initially installed, a TSR executive control program for controlling the input portion, a history function program for storing the history of work executed by the user, and partition information of the hard disk; a security portion including the security program storing portion; and a controller for controlling the input portion, the hard disk, the output and memory portion, and the security portion, wherein the hard disk is booted in response to whether the security portion is the initially installed security portion.

According to another aspect of the present invention, there is provided a security method for a personal computer including a hard disk and security portion for storing various programs for security of the personal computer, the security programs including a booting control program, a TSR executive control program and a history function program, wherein the booting control program is executed through the steps of: (a) preventing the booting of the personal computer if a password input by a user is not valid; (b) preventing the personal computer from being booted if the security portion is detached; (c) outputting a booting permission signal according to whether the security portion is the same as that initially installed in the PC together with the hard disk, and performing operations which enable the security portion to control the input/output of data to/from the hard disk using the security portion; and (d) booting the hard disk, and wherein the TSR executive control program is executed through the steps of: (a') examining the type of operating system in the current PC if an interrupt for controlling the input portion is generated by the user; (b') determining whether the user's command is for locking or opening; and (c') preventing the use of the input portion if the user's command is for locking and allowing the use of the input portion if the user's command is for opening, thereby completing the execution of the program, and wherein the history function program is executed through the steps of: (a") determining whether a history function is called if a user processes a command file; (b") storing the name of the corresponding command file, the execution initiation time of the file, and the identification (ID) number of the user in the security portion of the personal computer if the history function is called; and (c") performing an original interrupt operation if the history function is not called, thereby completing the execution of the program.

According to still another aspect of the present invention, there is provided a method of installing a security device in a personal computer for security of the personal computer, comprising the steps of: connecting the security device to a hard disk and a central controller of the personal computer; storing original booting data of a boot sector of the hard disk in a special file; installing new booting data in the boot sector; copying the new booting data installed in the boot sector in the security device; removing only a partition from the new booting data so as to prevent the personal computer from being used without the security device; and registering a password and an identification number of the personal computer in the hard disk and the security portion.

According to still yet another aspect of the present invention, there is provided a method of detaching a security device from a personal computer for security of the personal computer, wherein the method is performed by an authorized user installing again original booting data stored in a hard disk as a special file in the boot sector of the personal computer and removing a password.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
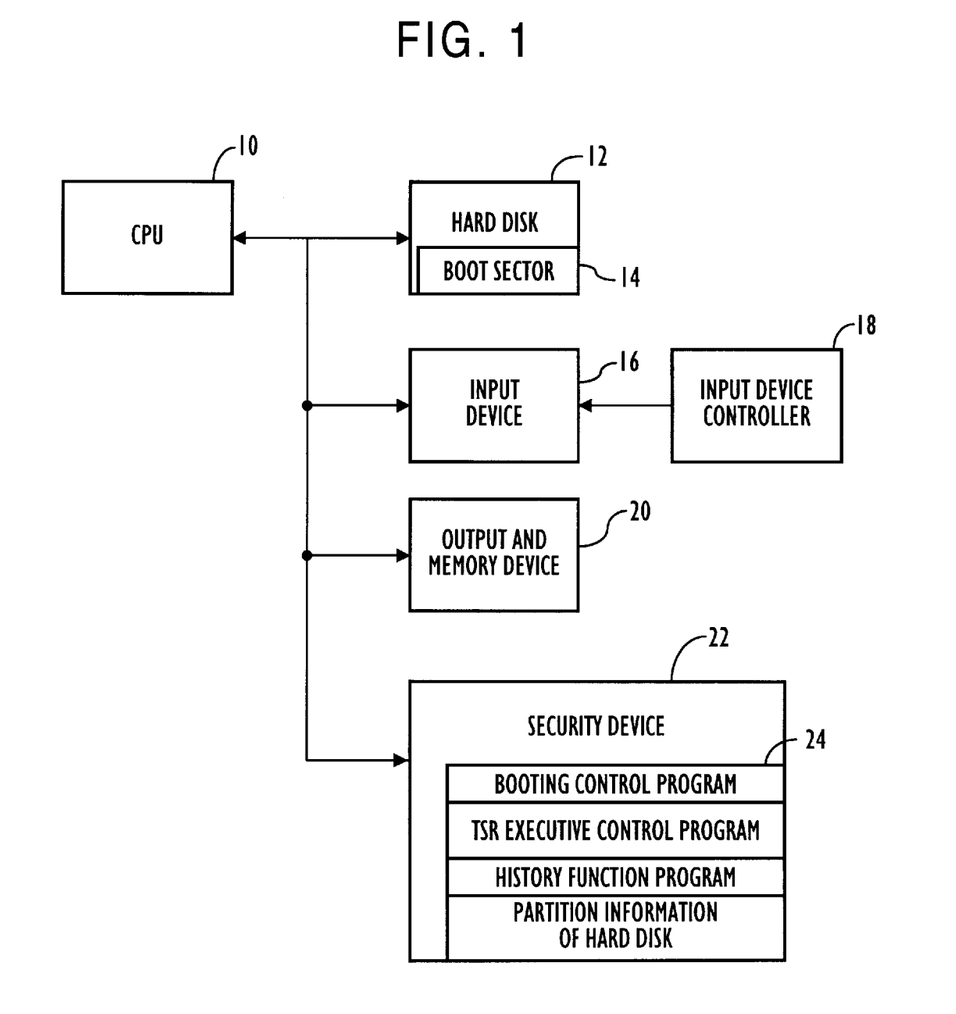
FIG. 1 is a block diagram of a PC having a security function according to the present invention.

As shown in FIG. 1, a PC having a security function according to the present invention is comprised of a central processing unit (CPU) 10, a hard disk 12, an input device 16, an input device controller 18, an output and memory device 20, and a security device 22 further comprised of a security program storing portion 24 which can be realized as an electrically erasable and programmable ROM (EEPROM).

The CPU 10 is for controlling the hard disk 12, the input device 16, the output and memory device 20, and the security device 22. The hard disk 12 is booted in response to a booting permission signal, stores a boot sector 14 without partition, and is booted according to whether the security device 22 corresponds to the initially installed security device. The input device 16 is for receiving a command from the user of the PC, the input device controller 18 using a terminate-and-stay-resident (TSR) executive control program is for controlling the input device 16 in accordance with the requirement of the user, and the output and memory device 20 is for outputting data and storing a password. The security device 22 includes a security program storing portion 24 in which the following programs are stored: a booting control program for generating the booting permission signal in response to an initializing signal, according to whether the password input by the user is valid and whether the hard disk 12 is the same as that initially installed therein, a TSR executive control program for controlling the input device 16, a history function program for storing the history of work executed by the user, and partition information of the hard disk 12.

According to the PC of the present invention, the booting control program is stored in both the boot sector 14 of the hard disk and the security program storing portion 24 and is used by both to verify each other when the initializing signal is input after power is supplied. Here, if either the boot sector 14 or the security program storing portion 24 fails to verify the existence of the other using the program, the PC cannot be booted.

Also, if the security device 22 is removed from the PC, for example, by an unauthorized user, which is then booted using a booting device other than the hard disk 12, the partition information of the hard disk 12 stored in the security program storing portion 24 is not available. Thus, the hard disk 12 cannot be used.

In the case where the use of the PC is authorized, after the PC is booted, the input device 16 can be controlled using the TSR executive control program stored in the EEPROM 24 according to the requirement of the user, so that a more perfect security system is guaranteed in the PC.

As shown in FIG. 1, the CPU 10, the hard disk 12, the input device 16, and the output and memory device 20 are connected to each other via a bus using corresponding adapters.

Figure 2:
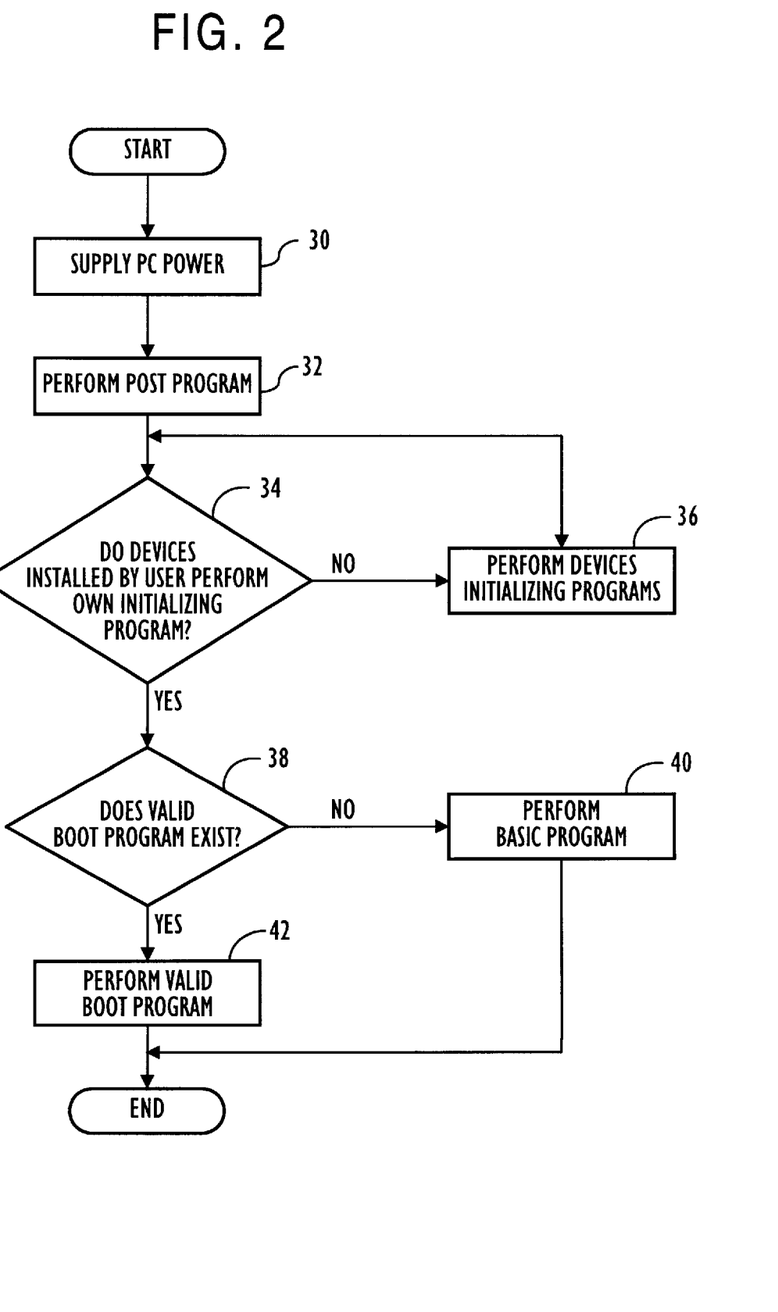
FIG. 2 is a flowchart illustrating a general booting procedure of a PC.

FIG. 2 is a flowchart illustrating a general booting procedure of the PC.

When power is supplied to the PC (Step 30), the PC performs a power on self-test (POST) for testing its various internal elements and for an initialization (Step 32). The POST program for Step 32 is stored in a ROM of the output and memory device 20. After Step 32, the PC determines whether or not the devices optionally installed in the PC by a user have a respective execution program in a predetermined range of addresses. If the execution programs exist, it is determined whether the corresponding devices are initialized (Step 34). If the initialization is not performed, the corresponding device is initialized by the PC all over the predetermined address range (Step 36). After the initializing programs have been performed, the PC starts to perform a booting procedure. After completely checking the devices having a respective boot program, it is determined whether a valid boot program exists in each device (Step 38). If the valid boot program does not exist, the PC performs a basic program stored in the ROM of the output and memory device 20 (Step 40). However, if the valid boot program does exist, the valid boot program of each device is performed (Step 42).

Figure 3:
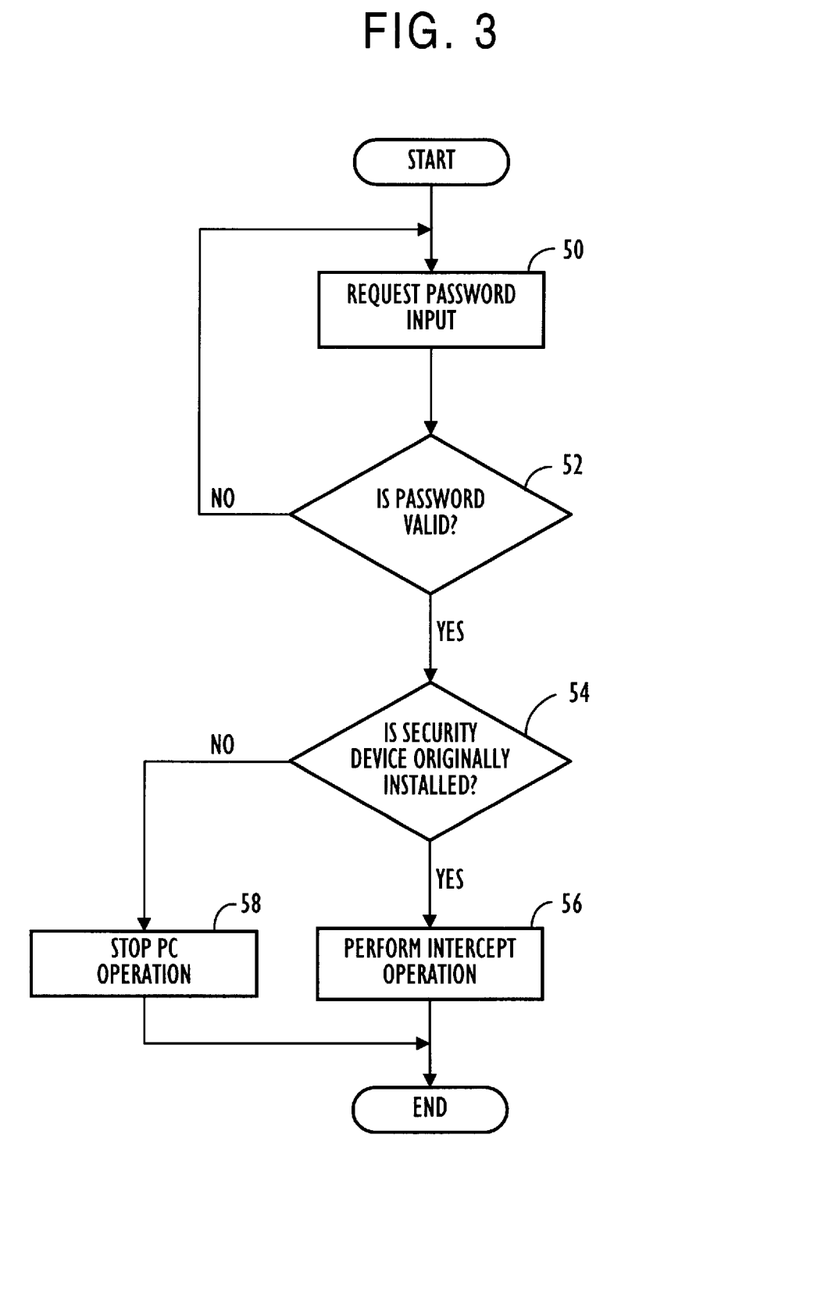
FIG. 3 is a flowchart illustrating a method of controlling the booting of the PC according to the present invention.

The method of initializing the security device 20, performed in Step 36 of FIG. 2, that is, a method of controlling the booting of the PC according to the present invention will be described with reference to FIG. 3.

The PC requests a user to input a password (Step 50). Then, the boot sector 14 determines whether the password is valid (Step 52). Here, the password can be stored in any part of the PC, where data can be written and read. That is, the password may be stored in the hard disk 12, the security device 22, the security program storing portion 24, a floppy disk, a non-volatile memory, a terminal connected to the PC and/or a card reader.

In Steps 50 and 52, the password of the user is continuously requested if the input password is not valid, so that the booting of the PC is held at a first security step. If it is determined that the password is valid in Step 52, the security device 22 compares its own identification (ID) number with a corresponding ID number stored in the boot sector 14 of the hard disk 12 for mutual authentication, to verify whether the PC is the same as the Pc in which it was installed, as a step for mutual verification between the security device 22 and the PC (Step 54). If the ID number of the security device 22 does not match the ID number of the boot sector 14 or does not exist in the boot sector 14, the operation of the PC is terminated (Step 58). Steps 54 and 58 are the second security steps for preventing the security device from being detached from the PC, or the PC from being booted by another hard disk. If the condition of Step 54 is satisfied, the security device 22 performs an intercepting operation at the occurrence of a disk I/O interrupt (Step 56). Step 56 is for preventing the data stored in the PC from being copied by an unauthorized user using an auxiliary memory device.

Figure 4:
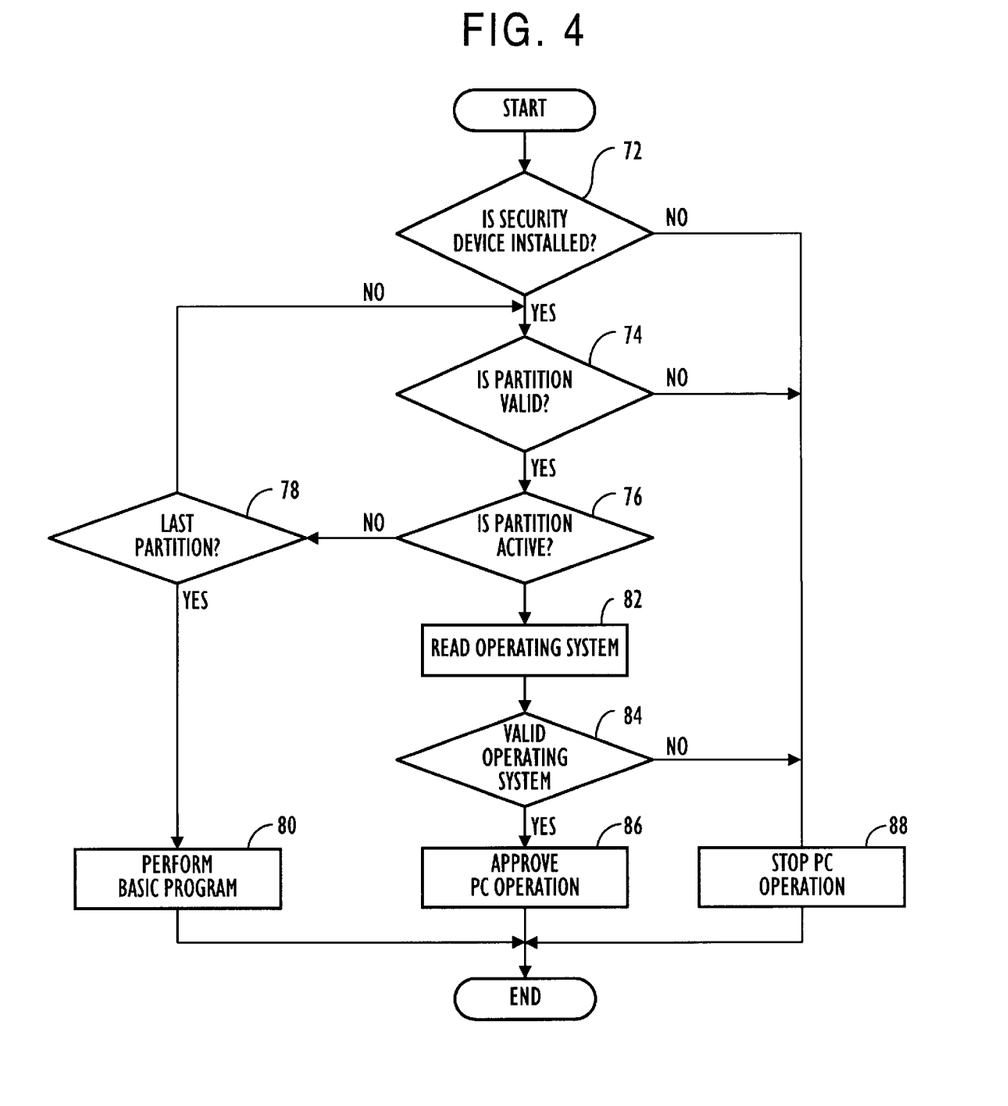
FIG. 4 is a flowchart illustrating Step 42 of FIG. 2.

Step 42 of FIG. 2 will be described with reference to FIG. 4 as follows.

First, the CPU 10 checks to see whether the security device 22 is installed in the PC (Step 72). If the security device 22 has been removed from the PC, the operation of the PC is terminated (Step 88). Otherwise, it is determined whether a partition stored in the security device 22 is valid (Step 74). If the partition is not valid, the operation of the PC is terminated (Step 88). However, if the partition is valid, it is determined whether the partition is active or not (Step 76). If a partition is valid but not active, it is then determined whether or not it is the last partition of the hard disk 12 (Step 78).

Here, a partition able to read data and a partition having an operating system are named as "valid partition" and "active partition", respectively. For example, a hard disk may be divided into several drives. Here, supposing that the hard disk is divided into four drives, each drive corresponds to a partition, and a drive having the operating system corresponds to the active partition.

If the current partition is determined to be the last one, that is, if there is no active partition, a basic program is performed (Step 80).

On the other hand, in Step 76, if the partition is active, the operating system is read therefrom (Step 82) and then it is determined whether or not the operating system is valid (Step 84). Here, if the operating system is not valid, the operation of the PC is terminated (Step 88). On the contrary, if the operating system is valid, control of the PC is transferred to the valid operating system (Step 86).

Figure 5:
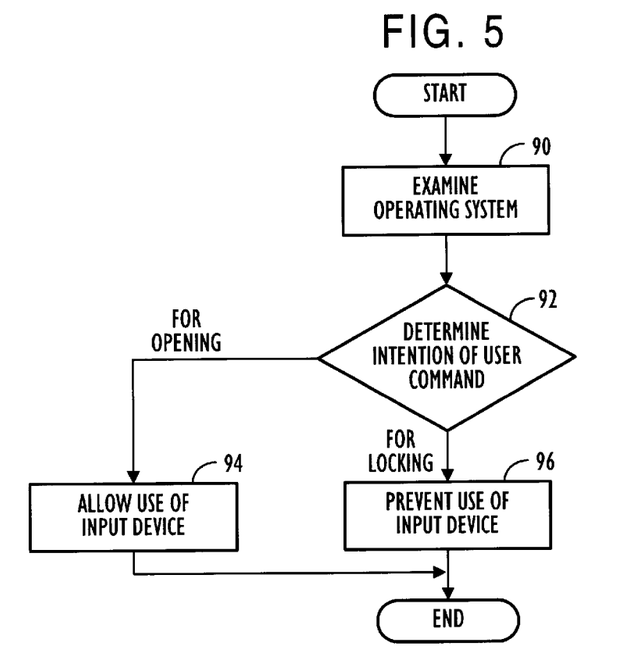
FIG. 5 is a flowchart illustrating a user interrupt operation of a TSR executive control program as a memory resident program stored in the EEPROM 24.

A user interrupt operation by the TSR executive control program stored in the security device 24 as a memory resident program will be described with reference to FIG. 5 as follows.

If an interrupt is generated by the user to control the input device 16, an interrupt processing procedure is started by the TSR executive control program. First, the security device 22 examines the type of operating system of the current PC so as to properly control the input device 16 according to the type of operating system, and stores the examined information (Step 90). Then, the user is intention is determined, that is, it is determined whether the user's command is for locking or opening (Step 92). If the command is for opening, the input device controller 18 allows the use of the input device 16 (Step 94). Otherwise, if the command is for locking, the input device controller 18 prevents the input device 16 from being used (Step 96) and the processing procedure is completed.

Figure 6:
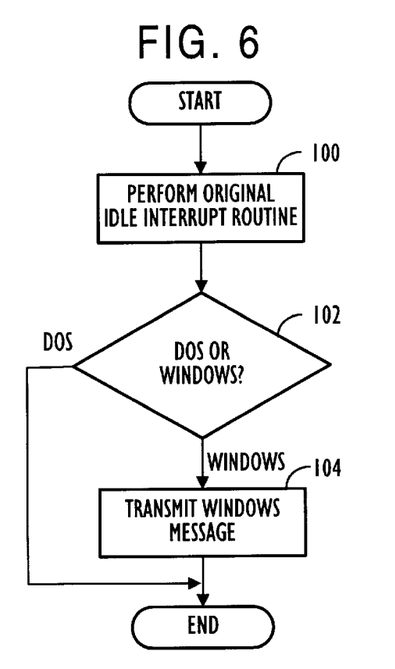
FIG. 6 is a flowchart illustrating an idle interrupt operation intercepted by the TSR executive control program.

An idle interrupt operation intercepted by the TSR executive control program will be described with reference to FIG. 6.

The idle interrupt routine is continuously performed in the PC system if there is no command from the user (Step 100). First, after performing the original idle interrupt routine, it is determined what type of operating system is installed, that is, whether the operating system is DOS or WINDOWS (Step 102). If the operating system is WINDOWS, an indication of the current control status of the input device 16 is transmitted thereto (Step 104) and the procedure is completed. However, if the operating system is DOS, the procedure is completed immediately.

Figure 7:
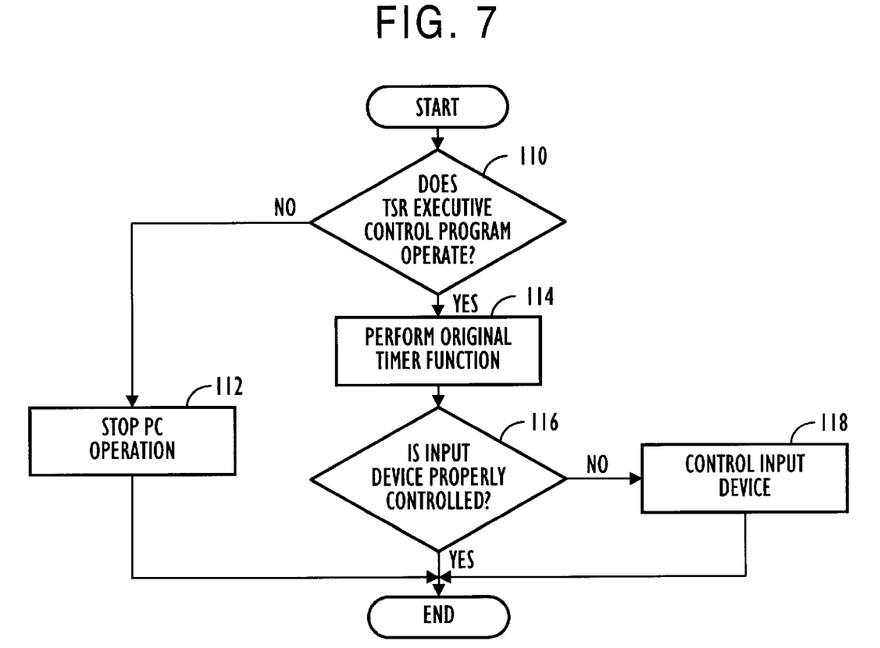
FIG. 7 is a flowchart illustrating a timer interrupt operation intercepted by the TSR executive control program and EEPROM 24.

Next, a timer interrupt processing procedure intercepted by the TSR executive control program will be described with reference to FIG. 7.

First, the timer interrupt determines whether the TSR executive control program operates normally (Step 110). If the TSR executive control program does not operate normally, the operation of the PC is immediately terminated (Step 112). However, if the TSR executive control program does operate normally, an original timer function is performed (Step 114). Then, it is determined whether the input device 16 is properly controlled in accordance with a command from the user (Step 116). If it is determined that the input device 16 is properly controlled, the operation is completed. However, if it is determined in Step 116 that the input device 16 is not properly controlled, it is then controlled according to the current command (Step 118).

Figure 8:
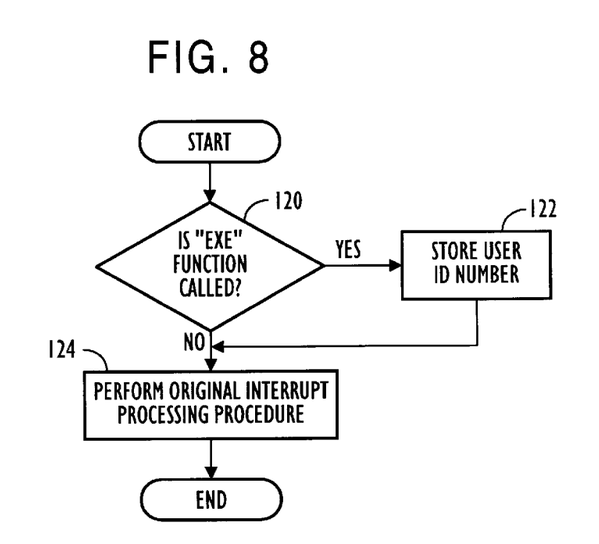
FIG. 8 is a flowchart illustrating a functional interrupt operation of DOS intercepted by the TSR executive control program for a history function.

A functional interrupt processing procedure of DOS intercepted by the TSR executive control program to perform the history function will be described with reference to FIG. 8.

If a user executes a command file, an execution (EXEC) function of the DOS functional interrupt is called. Thus, if the DOS interrupt process of the TSR executive control program is started, the security device 22 determines whether the EXEC function is called (Step 120). If the EXEC function is called, the name of the corresponding command file, an execution initiation time of the file, and the identification (ID) number of the user are stored in the history file (Step 122). However, if the EXEC function is not called, the original interrupt processing procedure is performed immediately (Step 124) and the DOS functional interrupt processing procedure is completed. Here, the history function is for protecting the files stored in the PC from being destroyed by an unauthorized user.

Figure 9A:
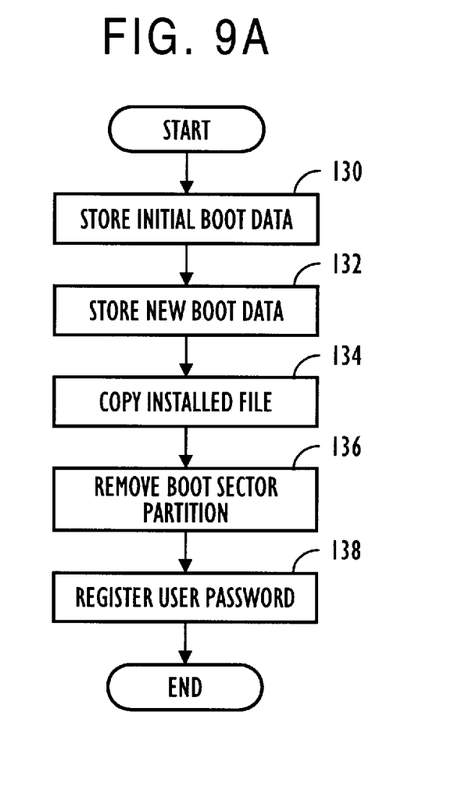
FIG. 9A is a flowchart illustrating a method of installing a security device in the PC according to the present invention.
Figure 9B:
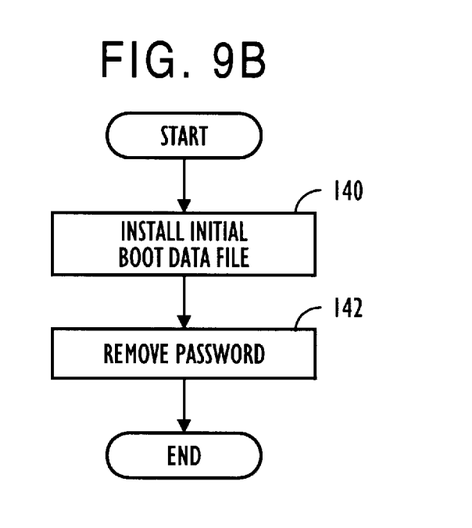
FIG. 9B is a flowchart illustrating a method of detaching the security device from the PC according to the present invention.

The methods of installing and detaching the security device 22 in and from the PC according to the present invention will be described with reference to FIGS. 9A and 9B.

When the installation of the security device 22 is initiated, an initial booting data stored in the boot sector 14 of the hard disk 12 installed in the original PC is stored in a special file (Step 130), and then a new booting data file is stored in the boot sector 14 of the hard disk 12 for security (Step 132). Next, the contents of the newly installed booting data file in the boot sector 14 of the hard disk 12 are copied in the security device 22 and the EEPROM 24 (Step 134). After Step 134, the partition of the boot sector 14 stored in the hard disk 12 is removed (Step 136) to prevent the system from being used without any security device. Then, the password and the identification number of the PC are registered in the hard disk 12 and the EEPROM 24 of the security device 22 (Step 138), thereby completing the installation of the security device 22.

The detaching operation of the security device 22 is permitted only for an authorized user. First, the special file having the initial booting data is installed in the boot sector 14 of the hard disk 12 to return the boot sector 14 to the initial state (Step 140). Then, the password stored in the EEPROM 24 is removed (Step 142), thereby completing the detaching operation of the security device 22.

As described above, according to the PC having a security function, security method therefor, and methods of installing and detaching a security device of the present invention, security is easily maintained through two steps: a first step is for controlling the booting of the PC using the password stored in the security device after being encrypted and the boot sector of the hard disk, and a second step is for preventing the input device from being used by an unauthorized user using the TSR executive control program after the PC has been booted. Thus, without an unauthorized use of the PC, the work executed by the authorized user can be continuously performed in the PC and the contents of the work can be stored therein.

What is claimed is:

1. A personal computer having a security function comprising:

input means for inputting a password and a user's command to the personal computer;

a hard disk having a boot sector without partition, which is booted in response to a booting permission signal;

output and memory means for outputting data and storing the password;

an input means controller for controlling said input means using a terminate-and-stay-resident (TSR) executive control program according to a requirement of the user after said hard disk is booted;

security program storing means for storing a booting control program for generating the booting permission signal in response to an initializing signal, according to whether the password input by the user is valid and whether said hard disk is the same as that initially installed, a TSR executive control program for controlling said input means, a history function program for storing a history of work executed by the user, and partition information of said hard disk;

security means including said security program storing means; and a controller for controlling said input means, said hard disk, said output and memory means, and said security means, wherein said hard disk is booted in response to whether said security means is an initially installed security means.

2. A security method for a personal computer including a hard disk and a security means for storing various security programs for security of the personal computer, said security programs including a booting control program, a terminate-and-stay-resident (TSR) executive control program and a history function program, wherein said booting control program is executed through the steps of:
(a) preventing booting of the personal computer if a password input by a user is not valid;
(b) preventing the personal computer from being booted if said security means is detached from the personal computer;
(c) outputting a booting permission signal according to whether said security means is the same as that initially installed in the PC together with said hard disk, and performing operations in order for said security means to control the input/output of data to/from said hard disk using said security means; and
(d) booting said hard disk;

wherein said history function program is executed through the steps of:
(a'') determining whether a history function is called if the user processes a command file;
(b'') storing a name of a corresponding command file, an execution initiation time of the command file, and an identification (ID) number of the user in said security means of the personal computer if the history function is called; and
(c'') performing an original interrupt operation if the history function is not called, thereby completing execution of the history function program.

3. A security method of a personal computer as claimed in claim 2, wherein said security means is an EEPROM.

4. A security method of a personal computer as claimed in claim 2, wherein said step (a) comprises the sub-steps of:
requesting the user of the personal computer to input the password if said security means is initialized; and
continuously requesting the user of the personal computer to input the password if the input password is not valid after a password validity determining process.

5. A security method of a personal computer as claimed in claim 2, wherein said step (b) comprises the sub-steps of:
determining whether said security means is the same as that initially installed in the personal computer and said hard disk is the same as that initially installed in the personal computer if the password is valid; and
terminating operation of the personal computer so as to prevent said hard disk from being booted if neither said security means nor said hard disk is the same as that initially installed in the personal computer.

6. A security method of a personal computer as claimed in claim 2, further comprising an idle interrupt processing procedure which is performed through the steps of:
continuously generating an idle interrupt to perform an original idle interrupt operation if there is no command from the user;
determining whether the type of operating system is DOS or WINDOWS after an original idle interrupt operation has been performed; and
transmitting a message to the WINDOWS if the operating system is WINDOWS, or completing the idle interrupt operation if the operating system is DOS.

7. A security method of a personal computer as claimed in claim 2, further comprising a timer interrupt processing procedure which is performed through the steps of:
(a''') determining whether the TSR executive control program operates in a normal manner;
(b''') performing an original timer function if the TSR executive control program operates in a normal manner;
(c''') terminating operation of the PC if the TSR executive control program does not operate in a normal manner;
(d''') determining whether said input means is controlled in accordance with the command of the user after said step (b''') of performing the original timer function; and
(e''') controlling said input means in accordance with a current command if it is determined in said step (d''') that said input means is not controlled properly in accordance with the command from the user, and completing the timer function if said input means is controlled properly in accordance with the command from the user.

8. A security method of a personal computer as claimed in claim 6, further comprising a timer interrupt processing procedure which is performed through the steps of:
(a''') determining whether the TSR executive control program operates in a normal manner;
(b''') performing an original timer function if the TSR executive control program operates in a normal manner;
(c''') terminating the operation of the PC if the TSR executive control program does not operate in a normal manner;
(d''') determining whether said input means is controlled in accordance with the command of the user after said step (b''') of performing the original timer function; and
(e''') controlling said input means in accordance with the current command if it is determined in said step (d''')

that said input means is not controlled properly in accordance with the command from the user, and completing the timer function if said input means is controlled properly in accordance with the command from the user.

9. A method of installing a security device in a personal computer for security of the personal computer, comprising the steps of:

connecting said security device to a hard disk and a central controller of the personal computer;

storing original booting data of a boot sector of said hard disk in a special file;

installing new booting data in said boot sector;

copying the new booting data installed in said boot sector in said security device;

removing only a partition from the new booting data so as to prevent the personal computer from being used without said security device; and registering a password and an identification number of the personal computer in said hard disk and said security means.

10. A security method according to claim 2, wherein said TSR executive control program is executed through the steps of:

(a') examining the type of operating system in the current PC if an interrupt for controlling said input means is generated by the user;

(b') determining whether a command of the user is for locking or opening; and (c') preventing use of said input means if the command of the user is for locking and allowing the use of said input means if the command of the user is for opening, thereby completing execution of the program.

11. A security method of a personal computer as claimed in claim 10, wherein said security means is an EEPROM.

12. A security method of a personal computer as claimed in claim 10, wherein said step (a) comprises the sub-steps of:

requesting the user of the personal computer to input the password if said security means is initialized; and continuously requesting the user of the personal computer to input the password if the input password is not valid after a password validity determining process.

13. A security method of a personal computer as claimed in claim 3, wherein said step (a) comprises the sub-steps of:

requesting the user of the personal computer to input the password if said security means is initialized; and continuously requesting the user of the personal computer to input the password if the input password is not valid after a password validity determining process.

14. A security method of a personal computer as claimed in claim 11, wherein said step (a) comprises the sub-steps of:

requesting the user of the personal computer to input the password if said security means is initialized; and continuously requesting the user of the personal computer to input the password if the input password is not valid after a password validity determining process.

15. A security method of a personal computer as claimed in claim 10, wherein said step (b) comprises the sub-steps of:

determining whether said security means is the same as that initially installed in the personal computer and said hard disk is the same as that initially installed in the personal computer if the password is valid; and terminating operation of the personal computer so as to prevent said hard disk from being booted if neither said security means nor said hard disk is the same as that initially installed in the personal computer.

16. A security method of a personal computer as claimed in claim 3, wherein said step (b) comprises the sub-steps of:

determining whether said security means is the same as that initially installed in the personal computer and said hard disk is the same as that initially installed in the personal computer if the password is valid; and terminating operation of the personal computer so as to prevent said hard disk from being booted if neither said security means nor said hard disk is the same as that initially installed in the personal computer.

17. A security method of a personal computer as claimed in claim 11, wherein said step (b) comprises the sub-steps of:

determining whether said security means is the same as that initially installed in the personal computer and said hard disk is the same as that initially installed in the personal computer if the password is valid; and terminating operation of the personal computer so as to prevent said hard disk from being booted if neither said security means nor said hard disk is the same as that initially installed in the personal computer.

18. A security method of a personal computer as claimed in claim 4, wherein said step (b) comprises the sub-steps of:

determining whether said security means is the same as that initially installed in the personal computer and said hard disk is the same as that initially installed in the personal computer if the password is valid; and terminating operation of the personal computer so as to prevent said hard disk from being booted if neither said security means nor said hard disk is the same as that initially installed in the personal computer.

19. A security method of a personal computer as claimed in claim 12, wherein said step (b) comprises the sub-steps of:

determining whether said security means is the same as that initially installed in the personal computer and said hard disk is the same as that initially installed in the personal computer if the password is valid; and terminating operation of the personal computer so as to prevent said hard disk from being booted if neither said security means nor said hard disk is the same as that initially installed in the personal computer.

20. A security method of a personal computer as claimed in claim 13, wherein said step (b) comprises the sub-steps of:

determining whether said security means is the same as that initially installed in the personal computer and said hard disk is the same as that initially installed in the personal computer if the password is valid; and terminating operation of the personal computer so as to prevent said hard disk from being booted if neither said security means nor said hard disk is the same as that initially installed in the personal computer.

21. A security method of a personal computer as claimed in claim 14, wherein said step (b) comprises the sub-steps of:

determining whether said security means is the same as that initially installed in the personal computer and said hard disk is the same as that initially installed in the personal computer if the password is valid; and terminating operation of the personal computer so as to prevent said hard disk from being booted if neither said security means nor said hard disk is the same as that initially installed in the personal computer.

22. A security method of a personal computer as claimed in claim 10, further comprising an idle interrupt processing procedure which is performed through the steps of:

continuously generating an idle interrupt to perform an original idle interrupt operation if there is no command from the user;

determining whether the type of operating system is DOS or WINDOWS after an original idle interrupt operation has been performed; and transmitting a message to the WINDOWS if the operating system is WINDOWS, or completing the idle interrupt operation if the operating system is DOS.

23. A security method of a personal computer as claimed in claim 10, further comprising a timer interrupt processing procedure which is performed through the steps of:

(a''') determining whether the TSR executive control program operates in a normal manner;

(b''') performing an original timer function if the TSR executive control program operates in a normal manner;

(c''') terminating operation of the PC if the TSR executive control program does not operate in a normal manner;

(d''') determining whether said input means is controlled in accordance with the command of the user after said step (b''') of performing the original timer function; and (e''') controlling said input means in accordance with a current command if it is determined in said step (d''') that said input means is not controlled properly in accordance with the command from the user, and completing the timer function if said input means is controlled properly in accordance with the command from the user.

24. A security method of a personal computer as claimed in claim 22, further comprising a timer interrupt processing procedure which is performed through the steps of:

(''') determining whether the TSR executive control program operates in a normal manner;

(b''') performing an original timer function if the TSR executive control program operates in a normal manner;

(c''') terminating the operation of the PC if the TSR executive control program does not operate in a normal manner;

(d''') determining whether said input means is controlled in accordacne with the command of the user after said step (b''') of performing the original timer funtion; and (e''') controlling said input means in accordance with the current command if it is determined in said step (d''') that said input means is not controlled properly in accordance with the command from the user, and completing the timer function if said input means is controlled properly in accordance with the command from the user.

* * * * *